United States Patent
Turek et al.

(10) Patent No.: US 10,843,903 B2
(45) Date of Patent: Nov. 24, 2020

(54) DRIVE BELT FOR A PEOPLE CONVEYOR

(71) Applicant: Otis Elevator Company, Farmington, CT (US)

(72) Inventors: Alexander Turek, Münchendorf (AT); Thomas Illedits, Neufeld an der Leitha (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/361,644

(22) Filed: Mar. 22, 2019

(65) Prior Publication Data

US 2019/0292018 A1    Sep. 26, 2019

(30) Foreign Application Priority Data

Mar. 23, 2018 (EP) ..................... 18163579

(51) Int. Cl.
| | |
|---|---|
| *B66B 23/02* | (2006.01) |
| *B66B 21/04* | (2006.01) |
| *B66B 21/10* | (2006.01) |
| *F16G 1/28* | (2006.01) |
| *F16G 3/02* | (2006.01) |

(52) U.S. Cl.
CPC .......... *B66B 23/024* (2013.01); *B66B 21/04* (2013.01); *B66B 21/10* (2013.01); *F16G 1/28* (2013.01); *F16G 3/02* (2013.01)

(58) Field of Classification Search
CPC .............................. B66B 23/024; B66B 23/10
USPC ........................................................ 198/330
See application file for complete search history.

(56) References Cited

U.S. PATENT DOCUMENTS

| | | | |
|---|---|---|---|
| 4,733,442 | A | 3/1988 | Asai |
| 7,410,033 | B2 | 8/2008 | Veronesi et al. |
| 8,112,861 | B2 | 2/2012 | Korkeakangas et al. |
| 2005/0279610 | A1 | 12/2005 | Ossendorf |

FOREIGN PATENT DOCUMENTS

| | | | | |
|---|---|---|---|---|
| CN | 202988472 U | 6/2013 | | |
| CN | 102992147 B | 8/2014 | | |
| CN | 104044905 B | 5/2016 | | |
| DE | 4130273 A1 * | 3/1993 | ............... | F16G 3/00 |
| DE | 102008002455 A1 | 12/2009 | | |
| DE | 102010054186 A1 * | 6/2012 | ............... | F16G 3/08 |
| DE | 102010054186 A1 | 6/2012 | | |
| EP | 2020399 A1 | 2/2009 | | |

(Continued)

OTHER PUBLICATIONS

European Search Report for EP 18163579.8, dated Oct. 10, 2018 (Year: 2018).*

(Continued)

*Primary Examiner* — Gene O Crawford
*Assistant Examiner* — Lester III Rushin
(74) *Attorney, Agent, or Firm* — Cantor Colburn LLP

(57) ABSTRACT

A drive belt segment (22) for forming a drive belt (20), in particular an endless drive belt (20) configured to be employed in a people conveyor (1), has two opposing ends and extends in a longitudinal direction between the two opposing ends. Each end is provided with a connector (30) which is configured for being connected to a corresponding connector (30) of the same or another drive belt segment (22) for forming an endless drive belt (20).

12 Claims, 15 Drawing Sheets

(56) References Cited

FOREIGN PATENT DOCUMENTS

| | | | |
|---|---|---|---|
| EP | 2949965 A1 * | 12/2015 | ............. B65G 15/36 |
| EP | 2949965 A1 | 12/2015 | |
| EP | 3257804 A1 * | 12/2017 | ........... B66B 23/024 |
| EP | 3257804 A1 | 12/2017 | |
| EP | 3267070 A1 | 1/2018 | |
| JP | 2002167127 A | 6/2002 | |
| WO | 2008105047 A1 | 9/2008 | |
| WO | 2008149409 A1 | 12/2008 | |
| WO | 2010057797 A1 | 5/2010 | |
| WO | 2011114514 A1 | 9/2011 | |
| WO | 2012038155 A1 | 3/2012 | |
| WO | 2013068170 A1 | 5/2013 | |

OTHER PUBLICATIONS

European Search Report for application EP 18163579.8, dated Oct. 10, 2018, 8 pages.
WikiVisually, "Rope splicing", available at: https://wikivisually.com/wiki/Rope_splicing, accessed: Mar. 21, 2019, 16 pages.

* cited by examiner

DRIVE BELT FOR A PEOPLE CONVEYOR

BACKGROUND

People conveyors such as escalators and moving walkways comprise a chain of conveyance elements (steps or pallets) extending in a conveyance direction between two landing portions. At least one drive element, such as a drive belt, extending along a closed loop is connected to the chain of conveyance elements. The at least one drive element is driven by a people conveyor drive for driving the chain of conveyance elements.

The length of the drive element needs to be adjusted to the length of the people conveyor. Thus, depending on the length of the respective people conveyor, a customized drive element needs to be provided for every people conveyor. Depending on the length of the people conveyor, the drive element may have a considerable length complicating the handling of the drive element.

It would be beneficial to facilitate the manufacture, installation, repair and maintenance of the drive element(s) employed in people conveyors.

SUMMARY

Exemplary embodiments of the invention include a drive belt segment for forming a drive belt, in particular an endless drive belt configured to be employed as a drive element in a people conveyor. The drive belt segment has two opposing ends and extends in a longitudinal direction between the two opposing ends. Each end is provided with a connector. Each connector is configured for being connected with a corresponding connector of the same or another drive belt segment for forming the drive belt.

Exemplary embodiments of the invention also include a people conveyor such as an escalator or a moving walkway comprising at least one drive belt according to an exemplary embodiment of the invention. In case of a moving walkway, the moving walkway may be inclined with respect to the horizontal, or it may extend horizontally.

Forming a drive belt by connecting a selected number of drive belt segments according to an embodiment of the invention allows adjusting the length of the drive belt according to the respective needs. Forming a long drive belt from a plurality of shorter drive belt segments facilitates the handling, in particular the transportation to the site of installation. In case a portion of a drive belt is damaged, it is sufficient to only replace the damaged segment(s) instead of the complete drive belt.

A number of optional features are set out in the following. These features may be realized in particular embodiments, alone or in combination with any of the other features.

Each drive belt segment may comprise at least one cord extending in the longitudinal direction and being mechanically connected with at least one of the connectors, in particular with both connectors. The at least one cord, which e.g. may be made of steel or synthetic fibers including aramid fibers, helps to provide the necessary strength of the drive belt segment, in particular with respect to forces acting in the longitudinal conveyance direction. The at least one cord may be embedded in a flexible cover material, in particular including an appropriate plastic material, such as polyurethane.

A plurality of cords may extend parallel to each other for increasing the strength of the drive belt segment.

A sleeve may be mounted to at least one end of the at least one cord. A sleeve in particular may be mounted to each end of the at least one cord, respectively. The sleeve(s) may be fixed to the cord(s) by press-fitting, brazing and/or welding. Each sleeve may have a cylindrical shape, the axis of the cylinder being oriented parallel to the cord, i.e. parallel to the longitudinal conveyance direction.

The connectors may be provided with at least one reception configured for receiving one of the sleeves, respectively. Arranging the at least one sleeve within at least one corresponding reception allows for a strong and reliable connection of the connectors with the cords. Each sleeve in particular may be held within a corresponding reception by a positively-fit coupling.

The at least one cord may extend linearly between the two opposing ends of the drive belt segment.

Alternatively, the at least one cord may extend through the drive belt segment forming a loop. The loop may at least partially extend through the at least one connector for providing a strong mechanical connection between the at least one cord and the at least one connector. The at least one cord in particular may extend multiply through the at least one connector for increasing the strength of the connection between the at least one cord and the at least one connector.

The at least one connector may comprise at least one groove for accommodating the at least one cord. The at least one connector in particular may comprise a plurality of grooves for accommodating a plurality of turns of the loop formed by the cord.

The at least one connector may comprise an opening for accommodating a connection element, such as a connection pin or a connection bolt, for connecting two adjacent connectors. The opening may extend transversely, in particular orthogonally, to the longitudinal conveyance direction. The connection element may be fastened within the opening by an appropriate fastening element, such as a screw, a fastening pin, a fastening ring, or a fastening disc applied to the connection element.

The drive belt segment may be a toothed drive belt segment comprising a plurality of teeth. A drive belt formed from toothed drive belt segments may engage with a correspondingly shaped driving sheave for efficiently driving the drive belt.

The at least one connector may be integrated into one of the teeth or a portion of a tooth, efficiently integrating the at least one connector with the structure of the drive belt segment.

The at least one connector in particular may comprise two portions, which, when, connected with each other, in combination form one of the teeth of the drive belt segment. In an alternative configuration, each portion of the connector may form a separate tooth of the drive belt segment.

DRAWING DESCRIPTION

In the following, exemplary embodiments of the invention are described with reference to the enclosed figures.

DETAILED DESCRIPTION

Figure 1:
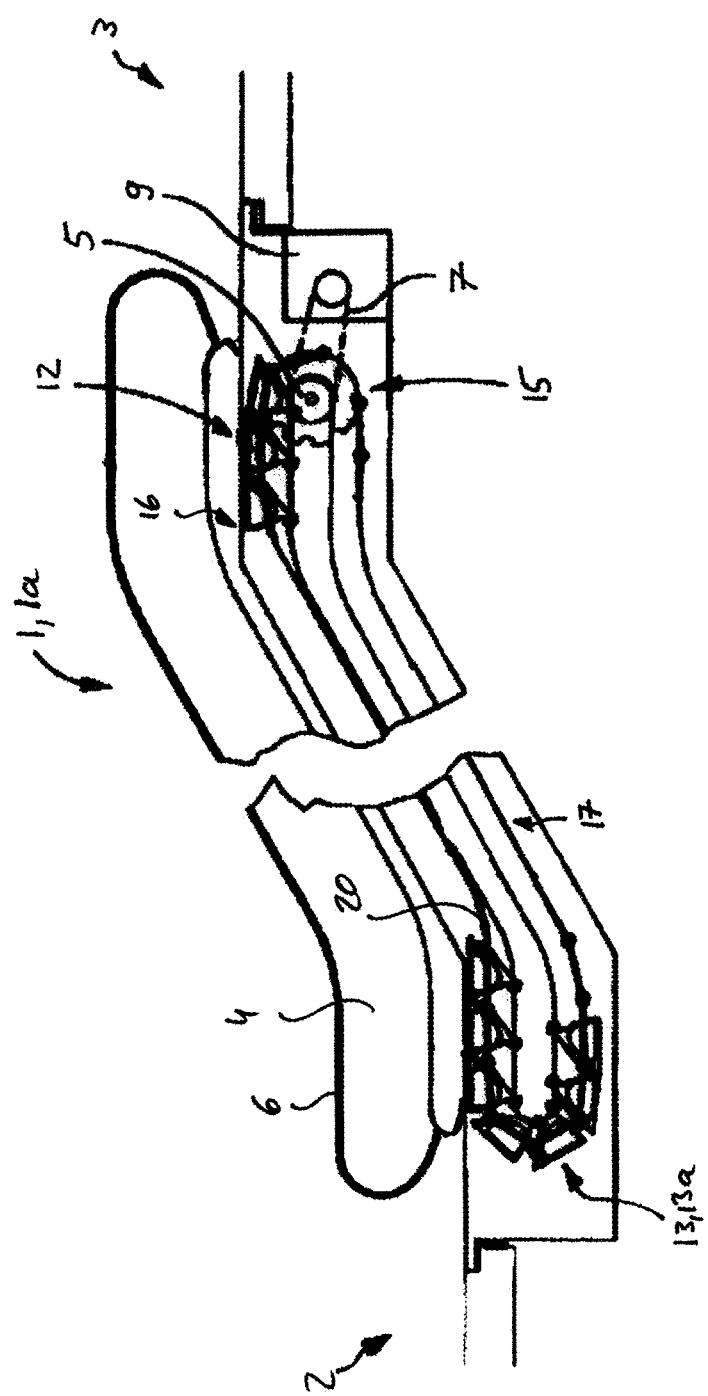
FIG. 1 depicts a schematic side view of an escalator.

FIG. 1 shows a schematic side view of a conventional people conveyor 1, in particular an escalator 1a, comprising a chain 12 of conveying elements 13 (steps 13a) extending in a longitudinal conveyance direction between two landing portions 2, 3. In turnaround portions next to the landing portions 2, 3 the chain 12 of conveying elements 13 passes from the conveyance portion 16 into the return portion 17, and vice versa. An endless drive belt 20 forming a closed loop is connected to the chain 12 of conveyance elements 13.

The drive belt 20 is driven by at least one sheave 15 mounted to a rotating shaft 5. A people conveyor drive 9 is configured for driving the rotating shaft 5 and in consequence the sheave 15 and the drive belt 20 via a transmission element 7, which may include a chain or belt.

Balustrades 4 supporting moving handrails 6 extend parallel to the conveyance portion 16.

Figure 2:
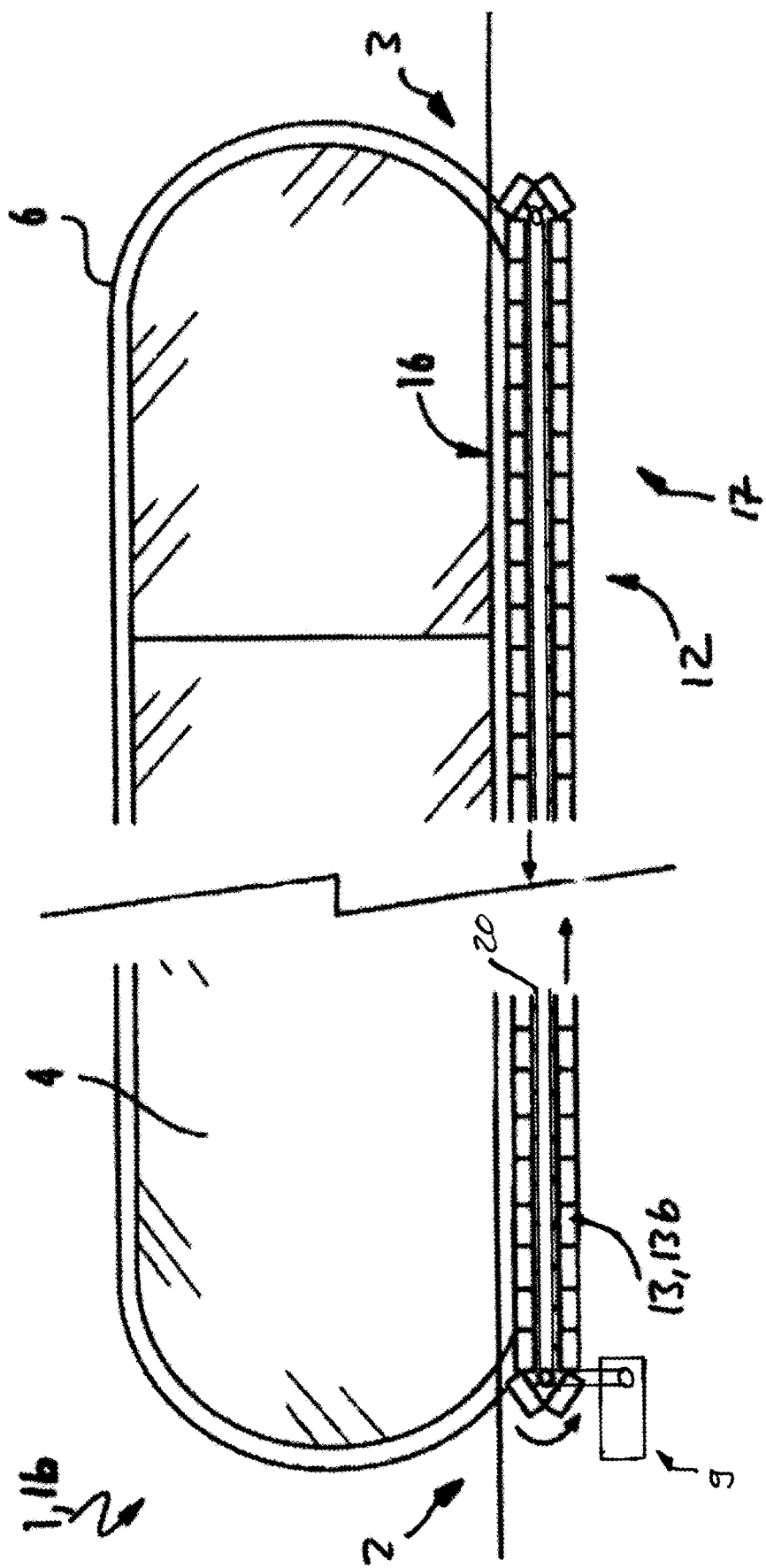
FIG. 2 depicts a schematic side view of a moving walkway.

FIG. 2 depicts a schematic side view of an alternative people conveyor 1, which is provided as a moving walkway 1b.

The moving walkway 1b comprises an endless chain 12 of conveying elements 13 (pallets 13b) moving in a longitudinal conveyance direction in an upper conveyance portion 16 and opposite to the conveyance direction in a lower return portion 17. Landing portions 2, 3 are provided at both ends of the moving walkway 1. In turnaround portions next to the landing portions 2, 3 the chain 12 of conveying elements 13 passes from the conveyance portion 16 into the return portion 17, and vice versa. Balustrades 4 supporting moving handrails 6 extend parallel to the conveyance portion 16.

Similar to the embodiment shown in FIG. 1, the chain 12 of conveying elements 13 is connected with an endless drive belt 20 driven by a people conveyor drive 9.

Figure 3:
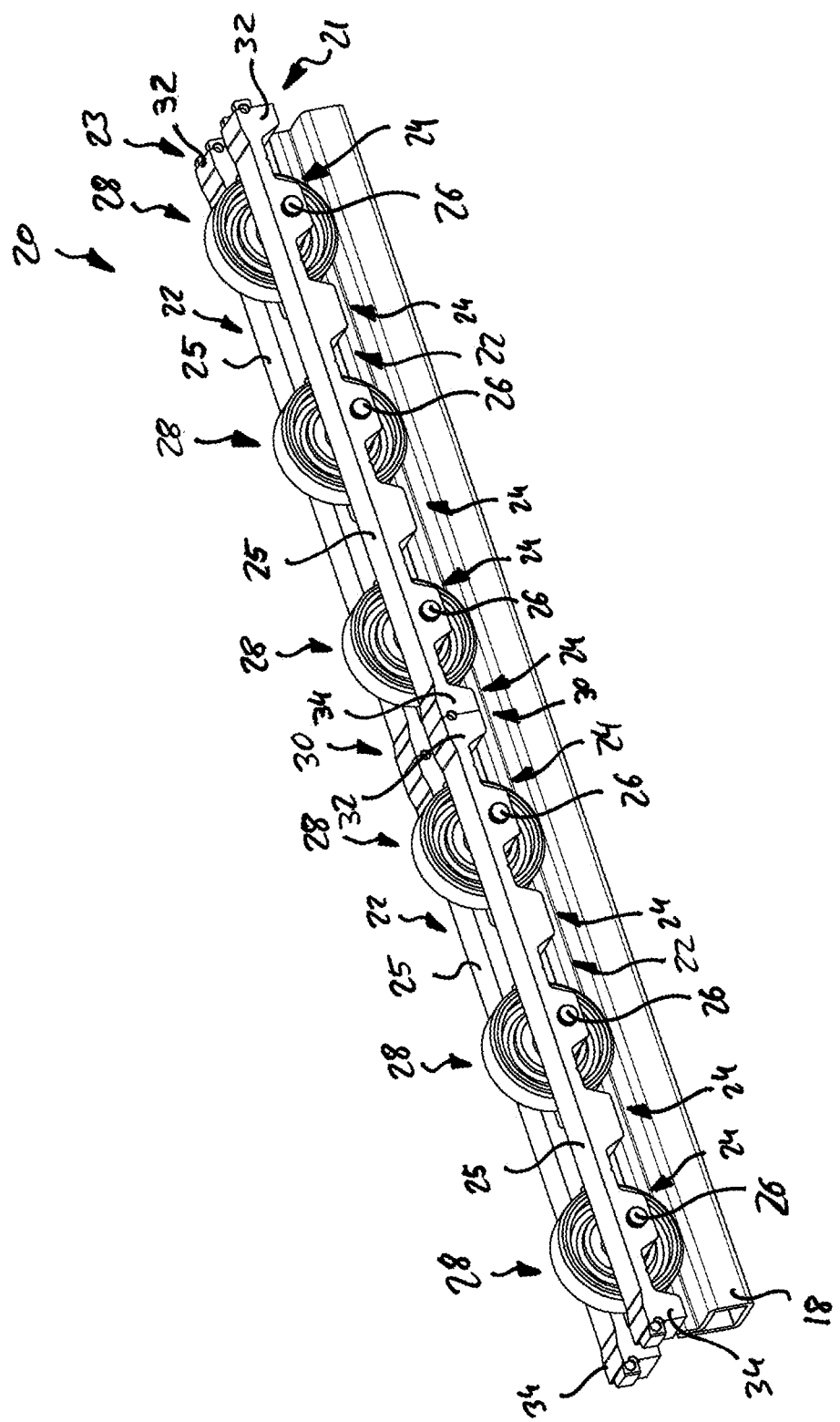
FIG. 3 depicts a perspective view of a portion of a drive belt according to an exemplary embodiment of the invention.

FIG. 3 depicts a perspective view of a portion of the drive belt 20 according to an exemplary embodiment of the invention.

The drive belt 20 comprises two strands 21, 23 extending parallel to each other in the longitudinal conveyance direction.

A plurality of teeth 24 are formed on one side of each strand 21, 23 and configured for engaging with a drive element 15 (drive sheave), which is not depicted in FIG. 3.

An axle 26 connecting the two strands 21, 23 with each other extends in a lateral direction, i.e. in a direction which is orthogonal to the longitudinal conveyance direction, through every second tooth 24. A roller 28, which is arranged between the two strands 21, 23, is rotatably supported by each of the axles 26, respectively. The rollers 28 are guided and supported by a guide rail 18.

Each strand 21, 23 comprises one or more drive belt segments 22 connected with each other in the longitudinal conveyance direction forming an endless loop. Two drive belt segments 22 of each strand 21, 23 are depicted in FIG. 3.

Two adjacent drive belt segments 22 are connected with each other by a connector 30. In the embodiment shown in FIG. 3, each connector comprises two connector portions 32, 34. When connected with each other, two adjacent connector portions 32, 34, in combination, form a tooth 24 of the respective strand 21, 23.

Figure 4:
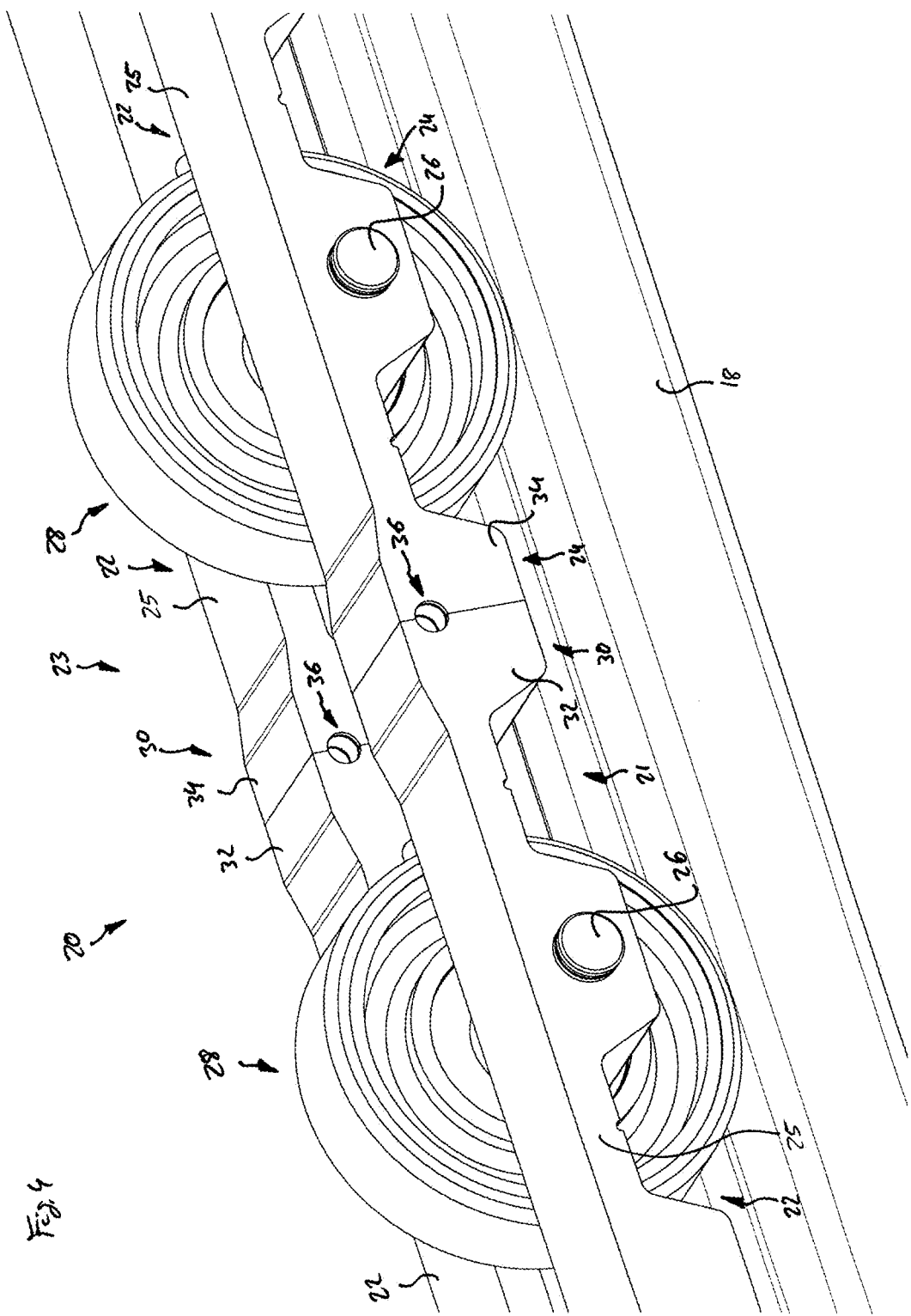
FIG. 4 shows an enlarged perspective view of a connection area of adjacent drive belt segments.

FIG. 4 shows an enlarged perspective view of an area in the vicinity of two connectors 30 respectively connecting two adjacent drive belt segments 22.

When arranged abutting each other, two adjacent connector portions 32, 34 attached to the drive belt segments 22 form a common opening 36 extending in the lateral direction, i.e. parallel to the axles 26. The opening 36 is configured for receiving a connection element 38, in particular a connection pin, which is not shown in FIGS. 3 and 4, for mechanically connecting the connector portions 32, 34 with each other.

Each drive belt segment 22 comprises one or more cord segments 40 extending parallel to each other in the longitudinal conveyance direction. The cord segments 40 are not visible in FIGS. 3 and 4, as they are covered by a flexible cover material 25.

Figure 5:
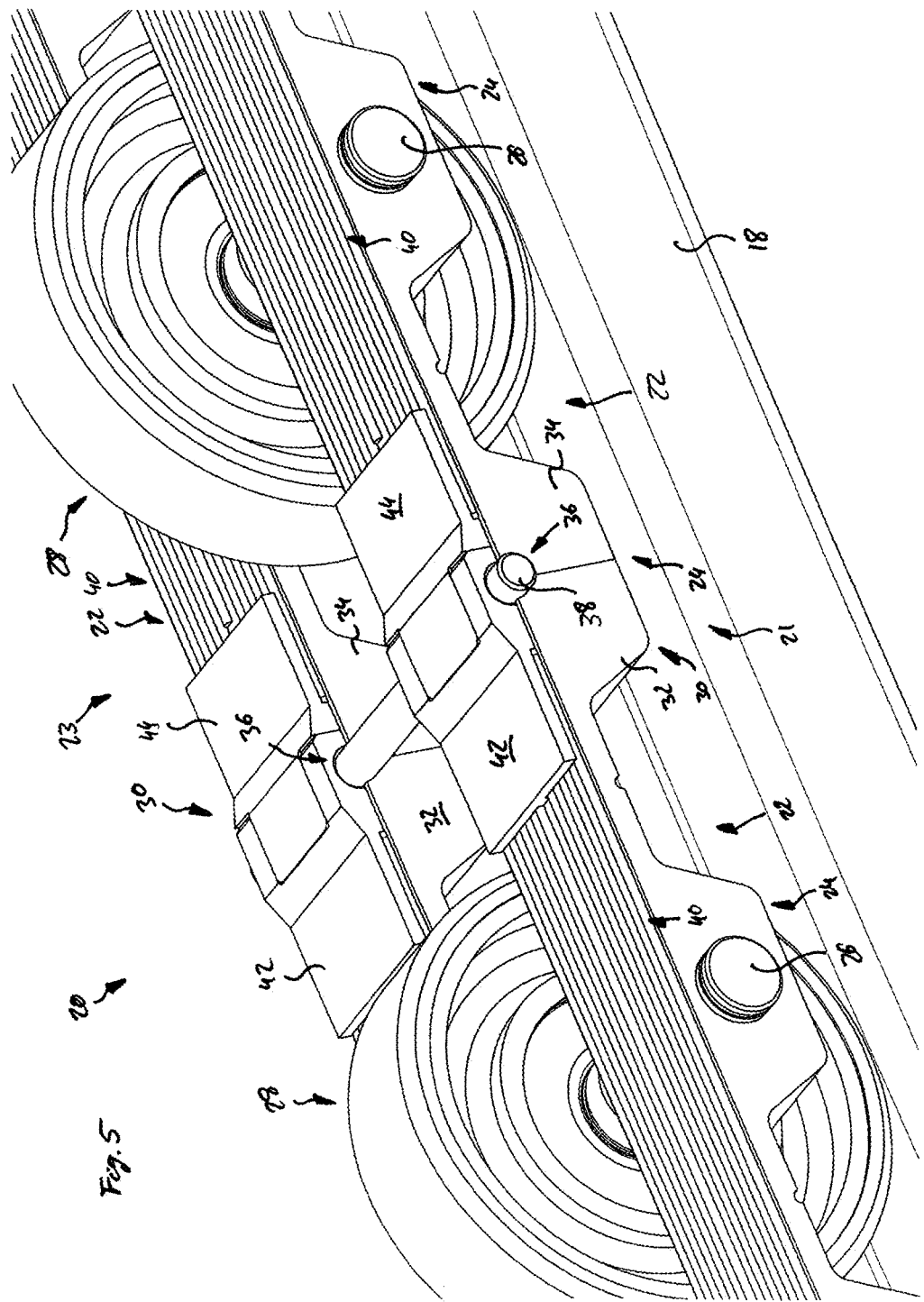
FIG. 5 shows an enlarged perspective view of the connection area of adjacent drive belt segments with an upper portion of the cover material being partially removed.

In FIG. 5, which basically corresponds to FIG. 4, an upper portion of the cover material 25 is not shown in order to depict the internal structure of the drive belt segments 22 and the connectors 30, respectively.

As a result, a plurality of cord segments 40 extending parallel to each other in the longitudinal conveyance direction are visible in FIG. 5.

The connection element 38 extending through the openings 36 formed within the connector portions 32, 34 is visible as well.

At the ends of the drive belt segments 22, the cord segments 40 are covered by cover portions 42, 44, in particular metallic cover portions 42, 44, which are part of the connector portions 32, 34.

Figure 6:
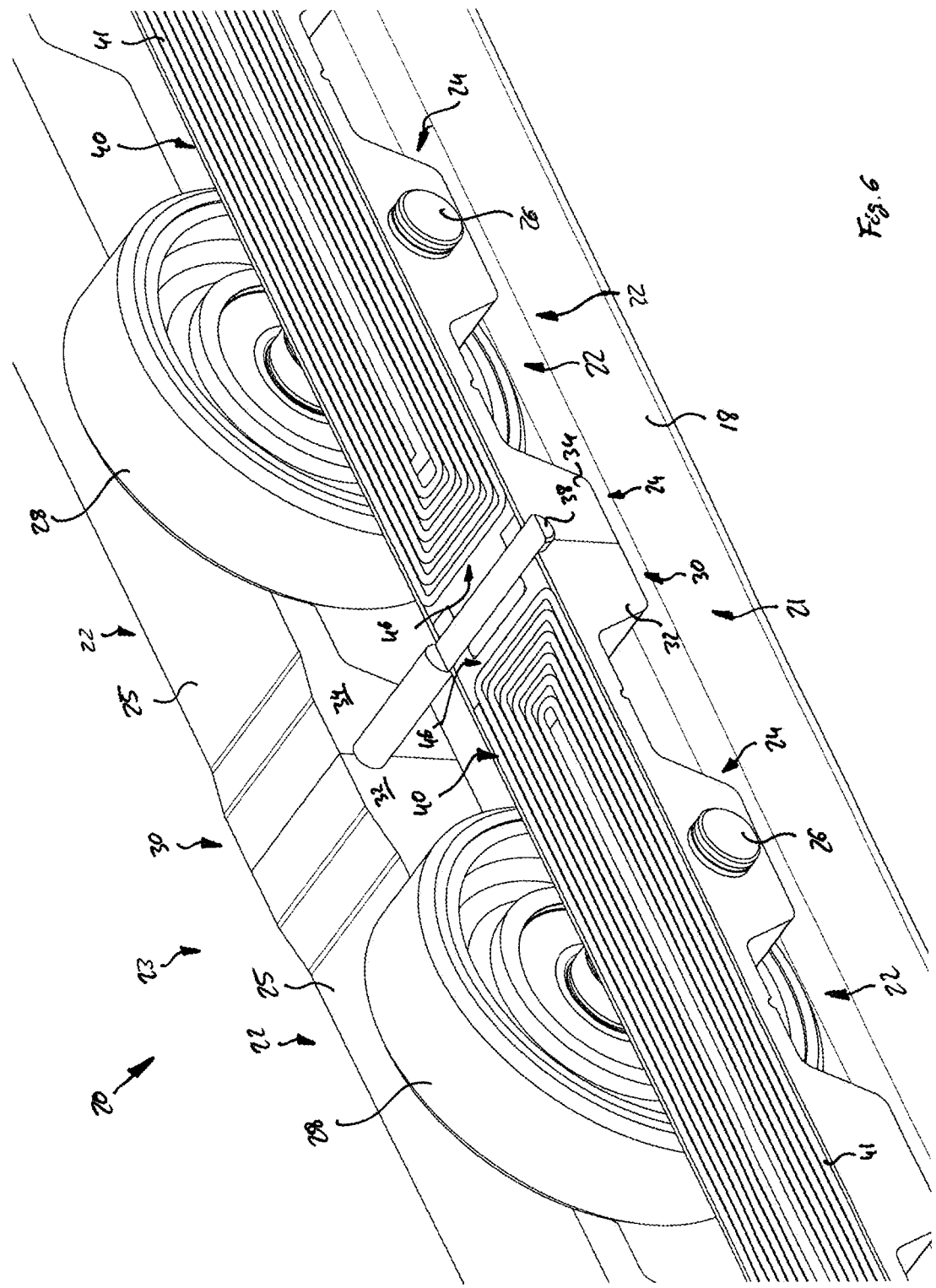
FIG. 6 shows an enlarged perspective view of the connection area of adjacent drive belt segments with an upper portion of the cover material and cover portions of a connector being removed.
Figure 7:
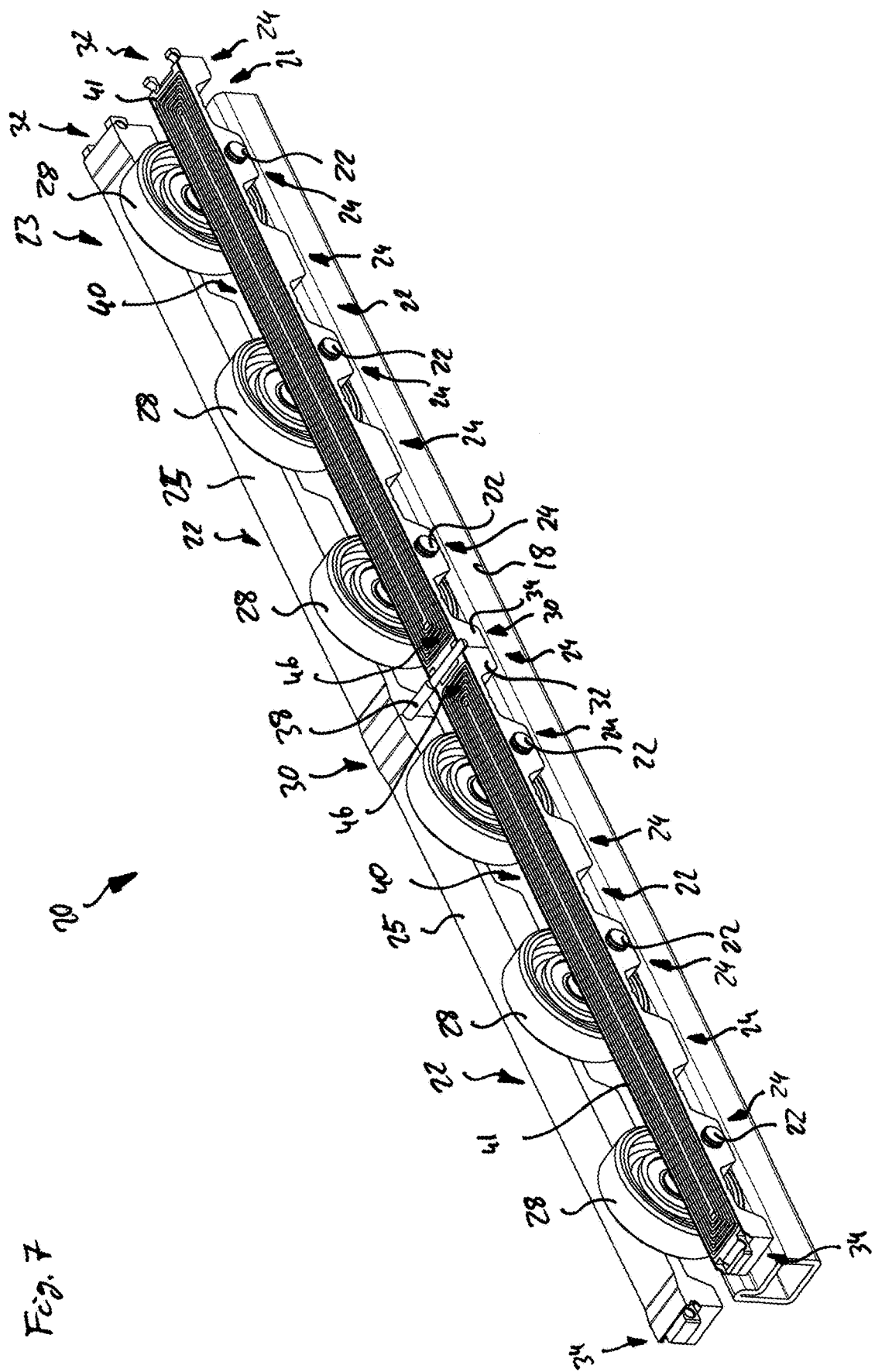
FIG. 7 depicts a perspective view of a portion of a drive belt according to an exemplary embodiment of the invention with an upper portion of the cover material being partially removed.

In FIGS. 6 and 7, the cover portions 42, 44 have been removed from the first strand 21 depicted in the lower portion of FIG. 6. The second strand 23 depicted in the upper portion of FIGS. 6 and 7 is still covered by the cover material 25.

FIGS. 6 and 7 illustrate that in each drive belt segment 22, the cord segments 40 are provided by a single cord 41, respectively. In each drive belt segment 22, the cord 41 extends in a plurality of loops through the drive belt segment 22 and the connector portions 32, 34. Thus, each cord 41 is mechanically connected with the connector portions 32, 34 by lateral cord portions 46 extending through the connector portions 32, 34 in the lateral direction. Such a configuration results in a very strong and reliable mechanical connection between the cords 41 and the connector portions 32, 34.

Figure 8:
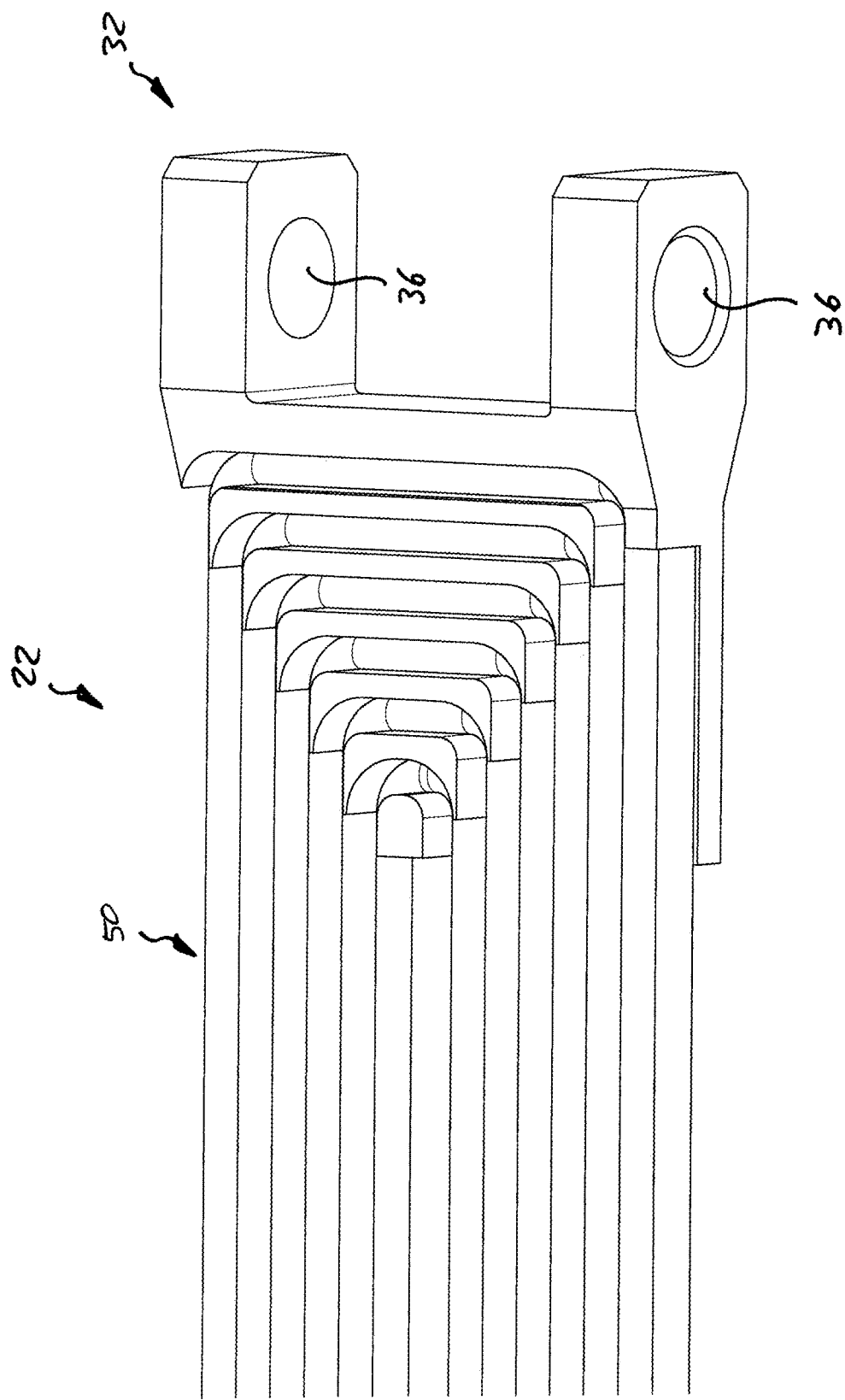
FIG. 8 depicts an end portion of a drive belt segment with a connector portion.

FIG. 8 depicts a perspective view of an end portion of a drive belt segment 22 with a connector portion 32 comprising a plurality of channels 50. The channels 50 are configured for accommodating the cord segments 40 of the cord 41 (not shown in FIG. 8), as it is illustrated in FIGS. 6 and 7.

Figure 9:
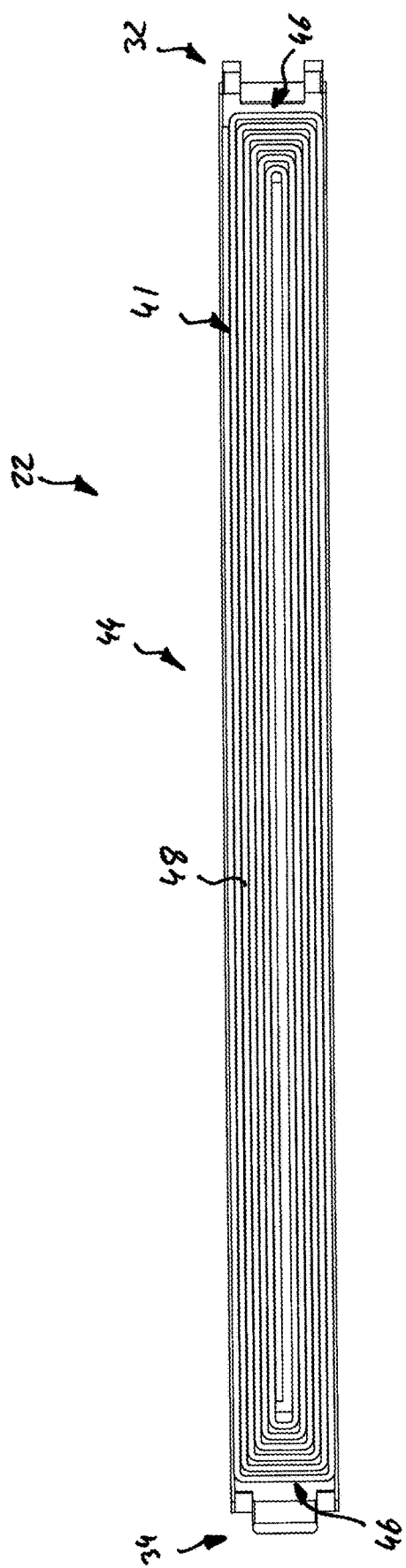
FIG. 9 depicts a top view of a drive belt segment without the cover material.

FIG. 9 depicts a top view of a drive belt segment 22 without the cover material 25. FIG. 9 in particular shows the cord 41 extending through the drive belt segment 22 in a plurality of loops, in particular comprising lateral cord portions 46 extending through the connector portions 32, 34 in the lateral direction, and longitudinal cord portions 48 extending between the opposing connector portions 32, 34 in the longitudinal conveyance direction.

Another exemplary embodiment of the invention is illustrated in FIGS. 10 to 15.

Features corresponding to the embodiment shown in FIGS. 3 to 9 are denoted with the same reference signs. In the following, only the differences between the embodiments will be discussed in detail.

Figure 10:
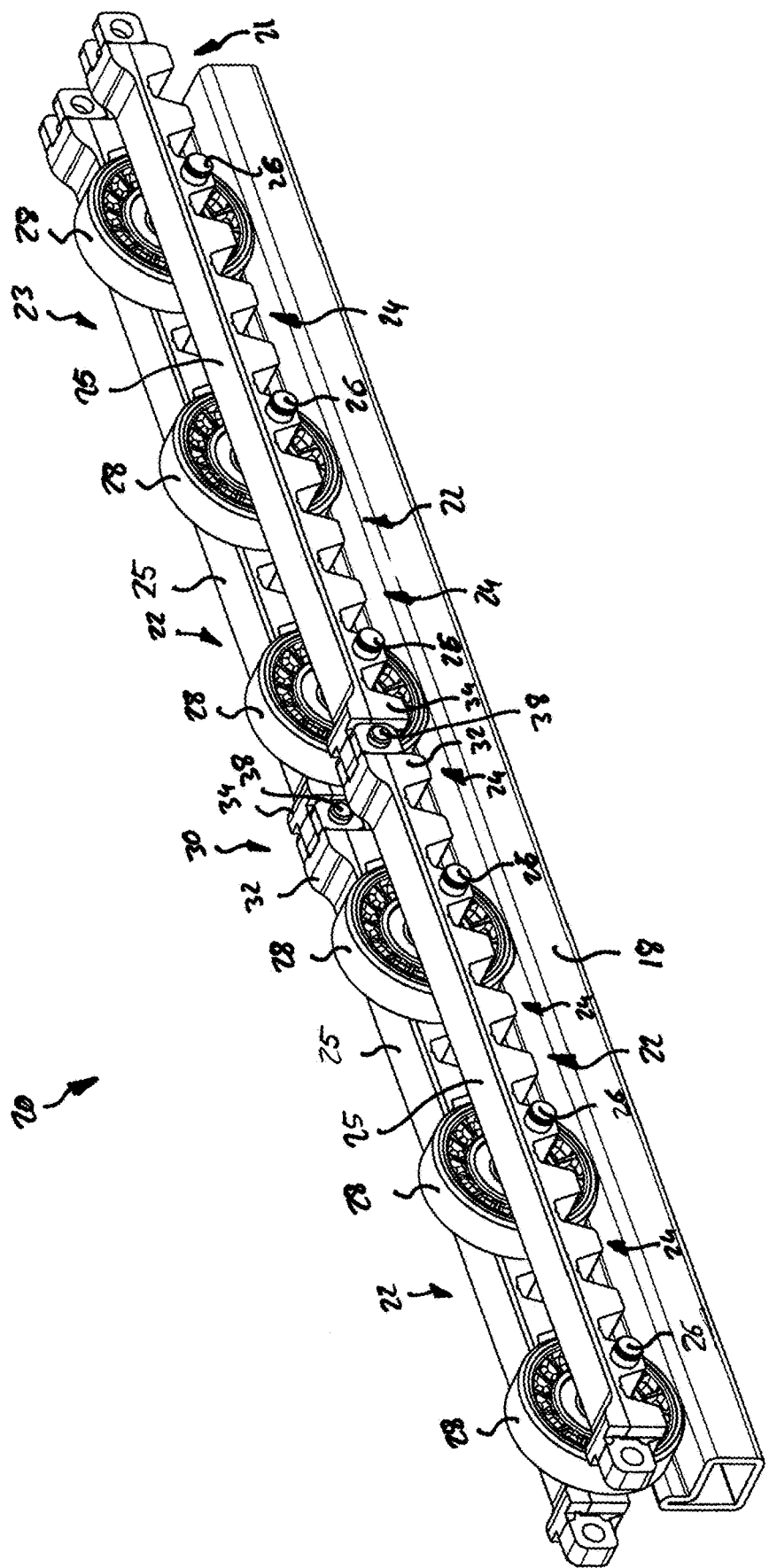
FIG. 10 depicts a perspective view of a portion of a drive belt according to another exemplary embodiment of the invention.

FIG. 10 basically corresponds to FIG. 3 depicting a perspective view of a portion of a drive belt 20 supported by a guide rail 18. As in the embodiment shown in FIG. 3, the drive belt 20 comprises two toothed strands 21, 23 extending parallel to each other in the longitudinal direction. Each strand 21, 23 comprises a plurality of drive belt segments 22.

Contrary to the embodiment shown in FIGS. 3 to 9, an axle 26 supporting a roller 28 extends only through every fourth tooth 24. For clarity of the illustration, reference signs are not assigned to every tooth 24.

The skilled person will understand that the ratio of two teeth 24 per roller 28 (FIGS. 3 to 9), or four teeth 24 per roller 28 (FIG. 10) is only exemplary and may be changed based on the actual needs. In particular, depending on the size of the rollers 28 and the teeth 24, axles 26 supporting rollers 28 may be provided at every tooth 24 or at every 3rd, 5th, 6th, 7th, 8th, . . . tooth 24 as well.

In the embodiment shown in FIGS. 10 to 15, the structure of the connectors 30 differs from the structure of the connectors 30 of the embodiment described before with reference to FIGS. 3 to 9.

Figure 11:
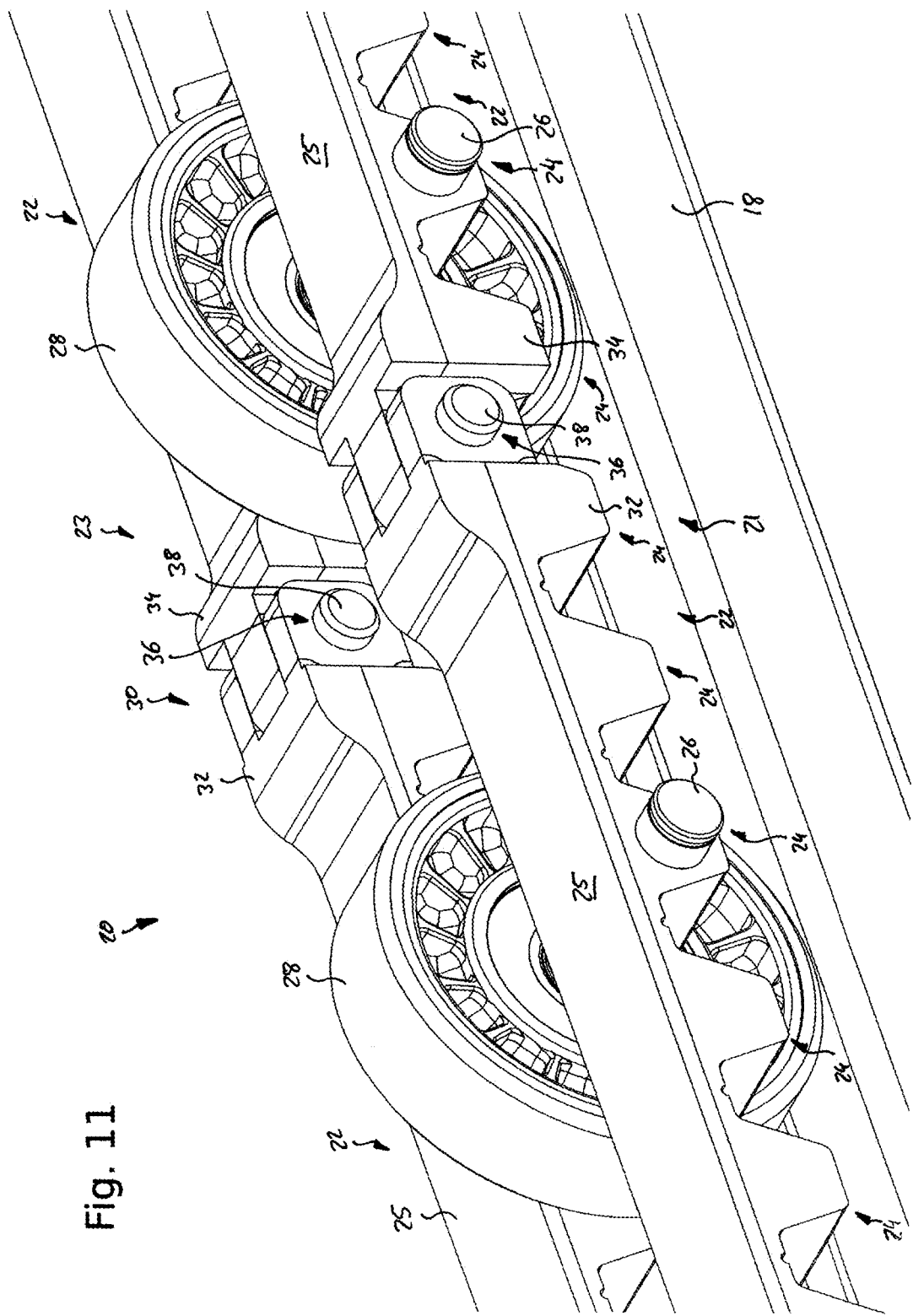
FIG. 11 shows an enlarged perspective view of a connection area of adjacent drive belt segments shown in FIG. 10.

FIG. 11 shows an enlarged view of the area around the connectors 30.

In the embodiment depicted in FIGS. 10 to 15, the two connector portions 32, 34 do not form a combined single tooth 24 when connected with each other. Instead, a separate tooth 24 is provided by each of the connector portions 32, 34, respectively.

Similar to the connector portions 32, 34 shown in FIGS. 3 to 9, two adjacent connector portions 32, 34 are connected with each other by a connection element 38, e.g. a connection pin, extending in the lateral direction through openings 36 formed within the connector portions 32, 34.

Similar to FIGS. 5 and 6, FIGS. 12 and 13 respectively show a horizontal sectional view through the first strand 21, which is depicted in the lower portion of the figures. FIG. 14 shows the drive belt segment 22 with all cover material 25 being removed.

Figure 12:
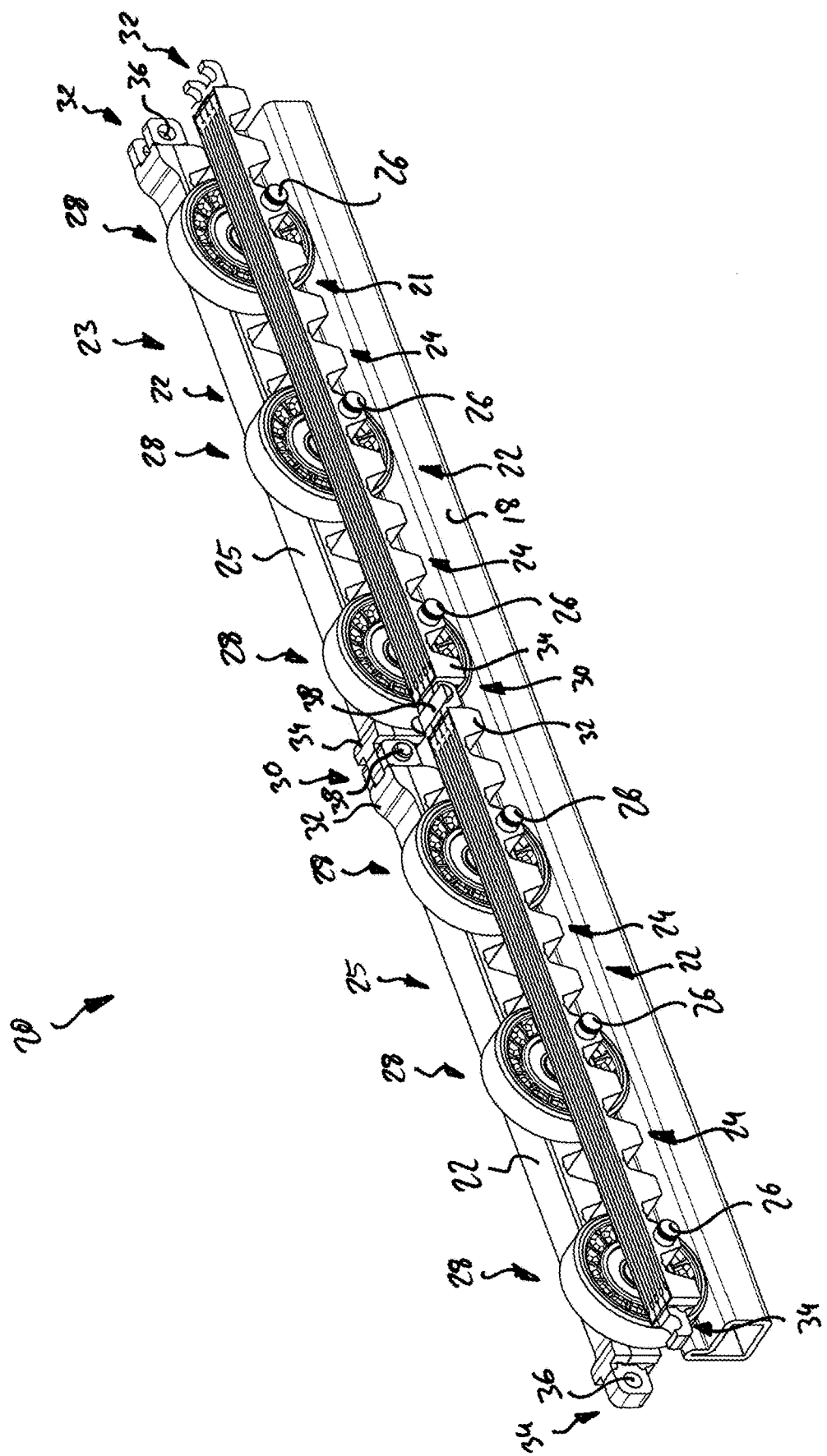
FIG. 12 depicts a perspective view of a portion of a drive belt shown in FIG. 10 with an upper portion of the cover material being partially removed.
Figure 13:
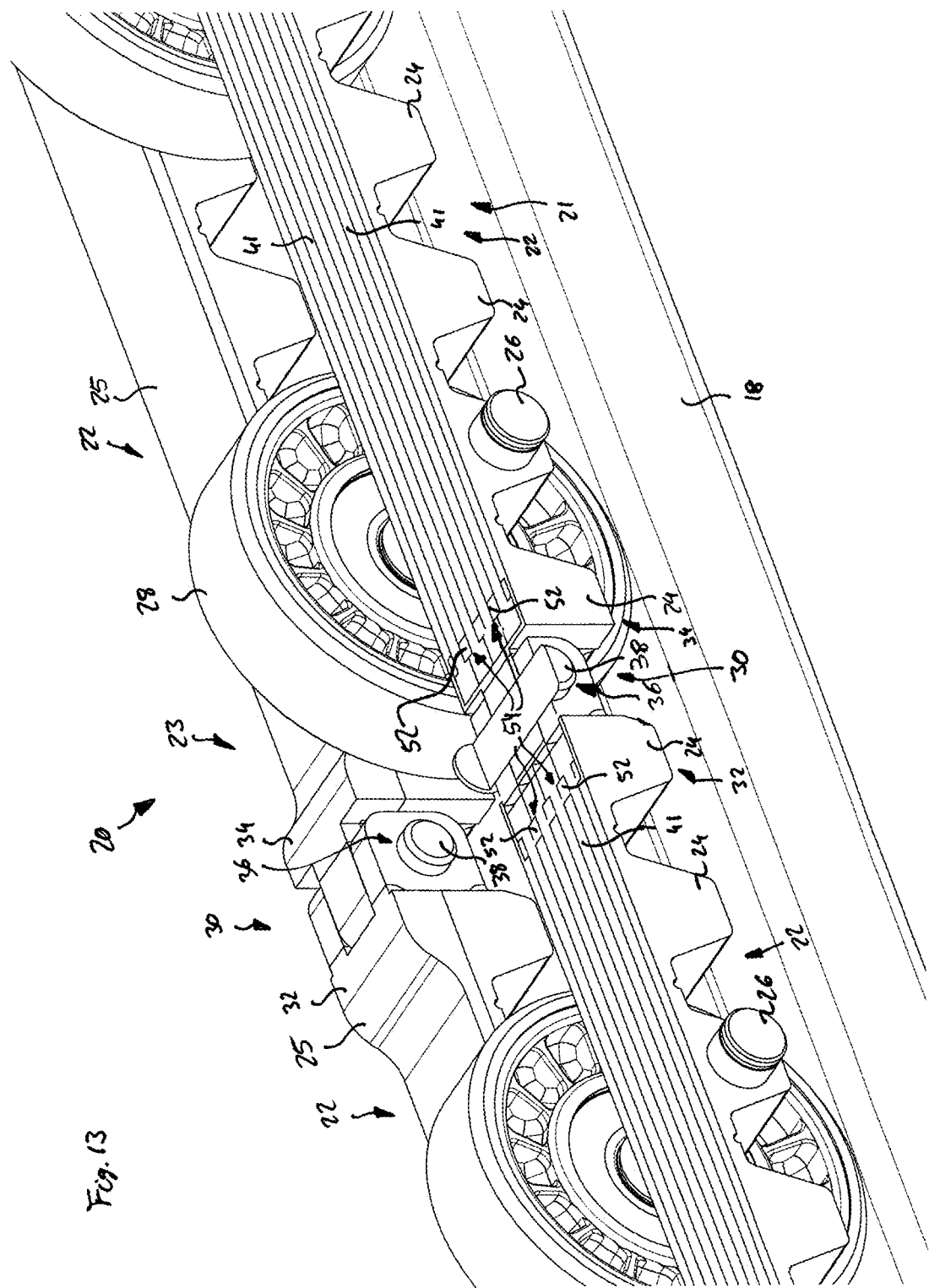
FIG. 13 shows an enlarged perspective view of the connection area of adjacent drive belt segments with an upper portion of the cover material being partially removed.
Figure 14:
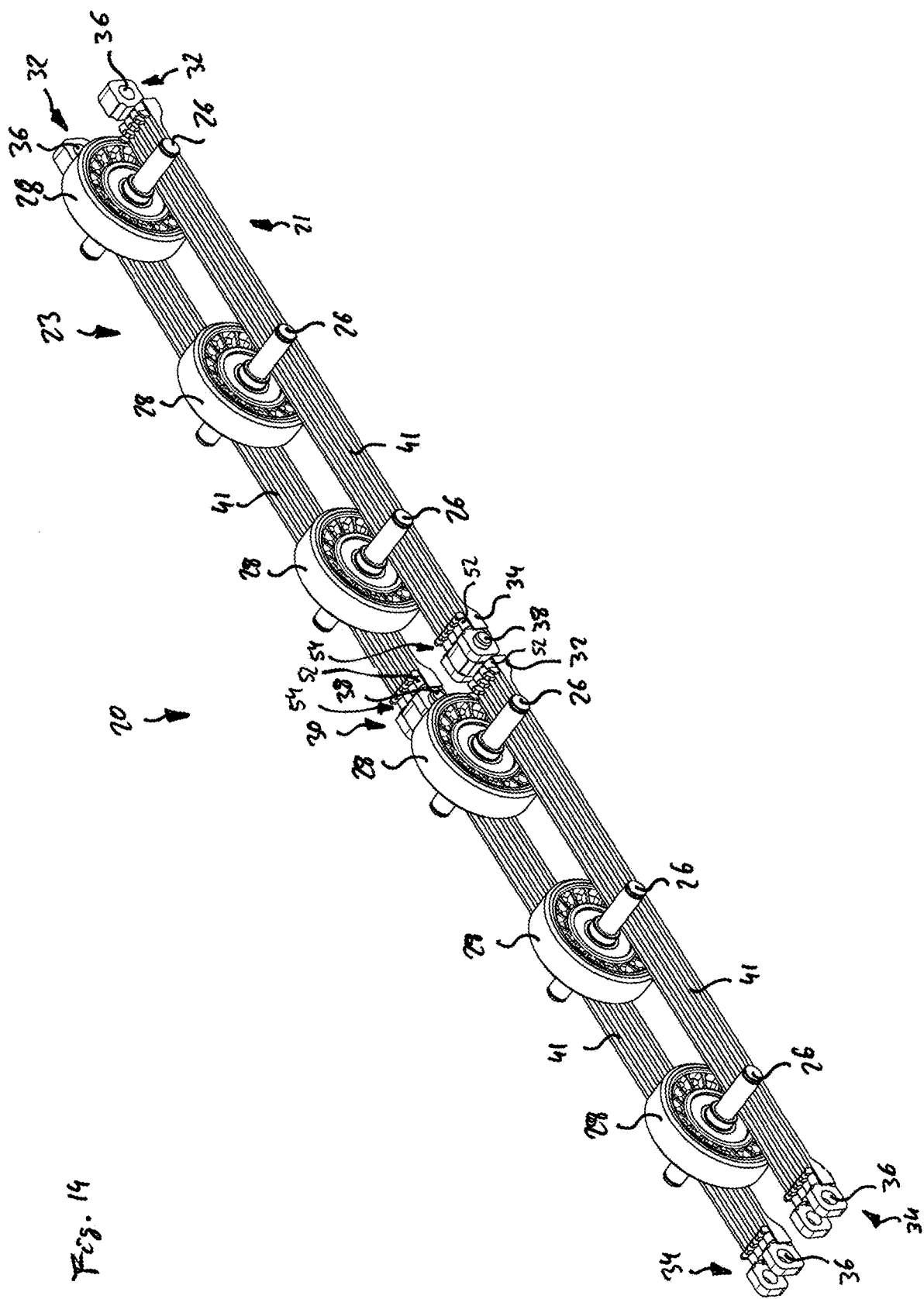
FIG. 14 shows a drive belt segment as shown in FIGS. 10 to 13 with all cover material being removed.

FIGS. 12 to 14 illustrate that the connection of the cords 41 to the connector portions 32, 34 differs from the embodiment shown in FIGS. 3 to 9.

Instead of a single cord 41 extending in a plurality of loops, each drive belt segment 22 comprises a plurality of cords 41 extending parallel to each other in the longitudinal conveyance direction. A sleeve 52, which may be made of a metal such as steel, is mounted, e.g. pressed, brazed and/or welded, to the ends of each cord 41. The sleeves 52 are accommodated in a corresponding reception 54 formed within the connector portions 32, 34 providing a strong and reliable connection between the cords 41 and the connector portions 32, 34. The sleeves 52 may have a cylindrical shape with the axis of the cylinder being oriented in the longitudinal conveyance direction. The sleeves 52 in particular may be held within the receptions 54 by a positively-fit coupling.

Figure 15:
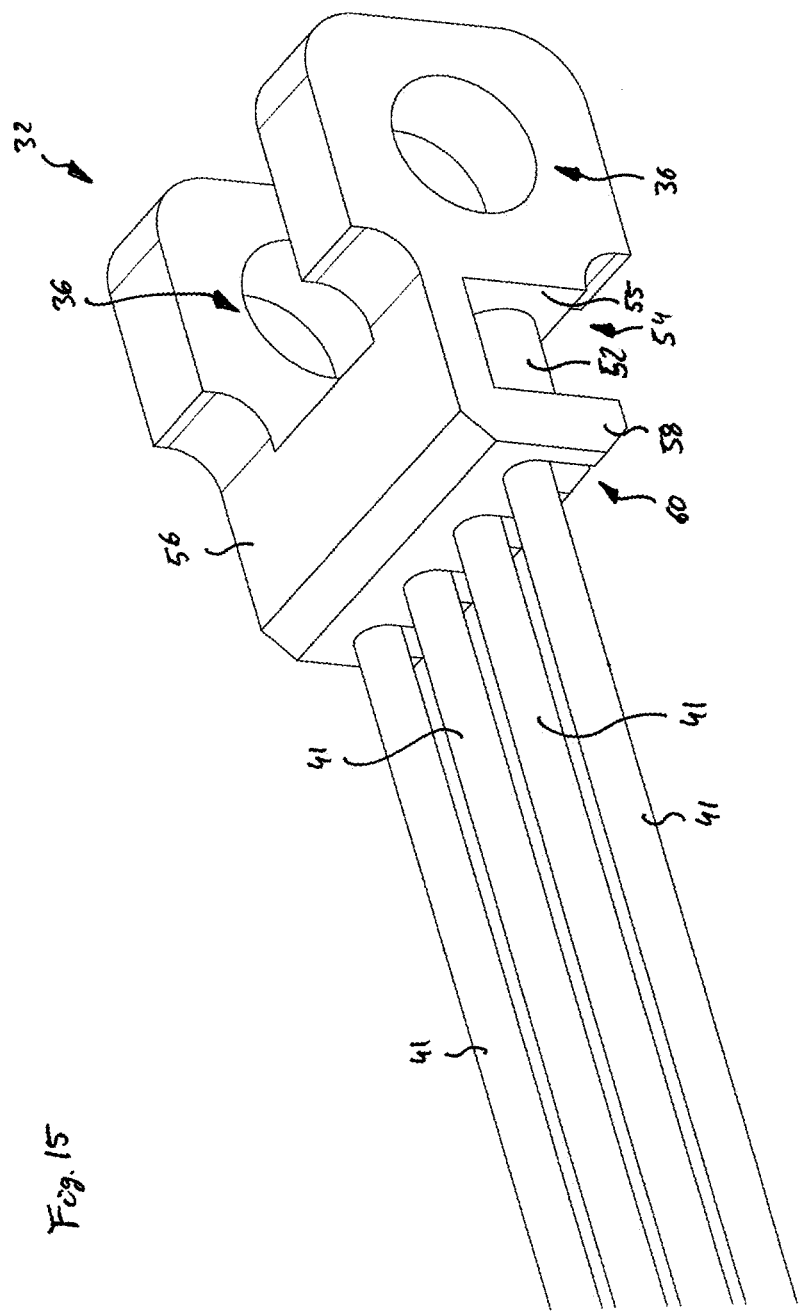
FIG. 15 shows an enlarged perspective view of a connector portion comprising a reception for accommodating sleeves attached to the cords.

FIG. 15 shows an enlarged perspective view of a connector portion 32 comprising a reception 54 for accommodating the sleeves 52 attached to the cords 41. Due to the perspective view, only one sleeve 52 is visible in FIG. 15.

The reception 54 comprises a wall 55 extending orthogonally to the longitudinal conveyance direction and an opposing leg 58 extending parallel to the wall 55 forming a reception space between the wall 55 and the leg 58. The leg 58 is attached to the wall 55 by a connection portion 56 extending parallel to the longitudinal conveyance direction between the wall 55 and the leg 58.

A plurality of apertures 60 is formed within the leg 58. The number of apertures 60 corresponds to the number of cords 41. As a result, a single cord 41 extends through each of the apertures 60, respectively. The diameter of the apertures 60 is large enough for passing the cords 41 through the apertures 60, but the diameter of the openings 60 is smaller than the outer diameter of the sleeves 52 so that the sleeves 52 cannot pass through the aperture 60 in the longitudinal conveyance direction.

In consequence, in a configuration in which the sleeves 52 are arranged within the reception space between the wall 55 and the leg 58, as it is shown in FIG. 15, the sleeves 52 are locked within the reception and cannot be pulled out of the reception 54 by pulling the cords 41 in the longitudinal conveyance direction.

The apertures 60 may be open on one side (the bottom side in the orientation shown in FIG. 15) in order to allow introducing the cords 41 into the apertures 60 and introducing the sleeves 52 into the reception 54 with the sleeves 52 being mounted to the cords 41. This facilitates mounting the cords 41 to the connector portions 32, 34.

After the sleeves 52 have been arranged within the reception 54 with the cords 41 passing through the apertures 60, the cords 41, the sleeves 52 and the connector portions 32, 34 are embedded within the cover material 25 preventing the sleeves 52 from coming out of the reception 54.

Although it is not explicitly shown in the figures, the skilled person will understand that the cords 41 may be connected with mounting portions 32, 34 forming a single tooth 24 as shown in FIGS. 3 to 9 by means of positive-locking according to the embodiment shown in FIGS. 10 to 15. Similarly, the cords 41 may be connected with mounting portions 32, 34 forming two separate teeth 24 as illustrated in FIGS. 10 to 15 by means of lateral cord portions 46 extending through the mounting portions 32, 34 according to the embodiment depicted in FIGS. 3 to 9.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodi-

REFERENCES 1 people conveyor
1a escalator
1b moving walkway
2, 3 landing portions
4 balustrade
5 rotating shaft
6 moving handrail
7 transmission element
9 people conveyor drive
12 chain of conveying elements
13 conveying elements
13a steps
13b pallets
15 drive element
16 conveyance portion
17 return portion
18 guide rail
20 drive belt
21 first strand
22 drive belt segment
23 second strand
24 tooth
25 cover material
26 axle
28 roller
30 connector
32, 34 connector portions
36 openings
38 connection element
40 cord segment
41 cord
42, 44 cover portions
46 lateral cord portion
48 longitudinal cord portion
50 channel
52 sleeve
54 reception
55 wall
56 connection portion
58 leg
60 aperture

What is claimed is:

1. Drive belt segment for forming a drive belt configured to be employed in a people conveyor, the drive belt segment comprising:
   two opposing ends and extending in a longitudinal direction between the two opposing ends;
   wherein each end is provided with a connector configured for being connected to a corresponding connector of the same or another drive belt segment;
   at least one cord extending in the longitudinal direction and being mechanically connected with both connectors;
   wherein the at least one cord extends through at least one of the connectors forming a loop extending at least partially through the at least one of the connectors;
   wherein the loop comprises lateral cord portions extending at least partially through the at least one of the connectors and longitudinal cord portions extending between the connector at each of the two opposing ends.

2. Drive belt segment according to claim 1, wherein a sleeve is mounted to at least one end of the at least one cord.

3. Drive belt segment according to claim 1, wherein the at least one cord extends linearly between the two opposing ends of the drive belt segment.

4. Drive belt segment according to claim 1, wherein the at least one cord extends multiply through at least one of the connectors forming a plurality of loops within the drive belt segment.

5. Drive belt segment according to claim 1, wherein the at least one cord is embedded in a cover material.

6. Drive belt segment according to claim 1 comprising a plurality of cords.

7. Drive belt segment according to claim 1, wherein the at least one connector comprises an opening for accommodating a connection element for connecting two adjacent connectors.

8. Drive belt segment according to claim 1, wherein the drive belt segment is a toothed drive belt segment comprising a plurality of teeth.

9. Drive belt segment according to claim 8, wherein the at least one connector is integrated into one of the teeth or a portion of a tooth.

10. Drive belt segment according to claim 1, wherein the at least connector is covered by a cover material.

11. Drive belt segment according to claim 5 wherein the cover material comprises a flexible cover material.

12. Drive belt segment according to claim 10 wherein the cover material comprises a flexible cover material.

* * * * *